United States Patent
Wohllebe

(10) Patent No.: US 6,557,887 B2
(45) Date of Patent: May 6, 2003

(54) SAFETY DEVICE HAVING AT LEAST ONE BACK SEAT AIRBAG, FOR A MOTOR VEHICLE

(75) Inventor: Thomas Wohllebe, Braunschweig (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/976,652

(22) Filed: Oct. 12, 2001

(65) Prior Publication Data

US 2002/0036398 A1 Mar. 28, 2002

Related U.S. Application Data

(63) Continuation of application No. PCT/EP00/02278, filed on Mar. 15, 2000, now abandoned.

(30) Foreign Application Priority Data

Apr. 14, 1999 (DE) .......................................... 199 16 848

(51) Int. Cl.[7] .............................................. B60R 21/22
(52) U.S. Cl. ................... 280/730.1; 297/216.13
(58) Field of Search .......................... 280/730.1, 728.1, 280/728.2, 728.3, 753; 297/216.13

(56) References Cited

U.S. PATENT DOCUMENTS

| 5,324,071 A | 6/1994 | Gotomyo et al. |
| 5,738,368 A | 4/1998 | Hammond et al. ...... 280/730.1 |
| 5,782,529 A | 7/1998 | Miller, III et al. ...... 297/216.13 |

FOREIGN PATENT DOCUMENTS

| DE | 19540911 | 4/1999 |
| FR | 2131475 | 11/1972 |
| GB | 1383922 | 2/1975 |

OTHER PUBLICATIONS

English–language Abstract for JP 04 166 455, published Jun. 12, 1992.

Primary Examiner—Peter C. English
(74) Attorney, Agent, or Firm—Baker Botts LLP

(57) ABSTRACT

A rear seat airbag device is arranged with an airbag housing mounted to a rear portion of a front seat of a vehicle. The housing has an airbag deployment opening which deploys the airbag upwardly and toward the head and chest portion of a rear seat occupant.

4 Claims, 3 Drawing Sheets

SAFETY DEVICE HAVING AT LEAST ONE BACK SEAT AIRBAG, FOR A MOTOR VEHICLE

This application is a continuation of application PCT/EP00/02278, filed Mar. 15, 2000, now abandoned. The invention relates to a safety device having at least one back seat airbag for a motor vehicle.

BACKGROUND OF THE INVENTION

Safety devices for a motor vehicle, having airbag apparatus, are generally known in various embodiments. In particular, airbag apparatus with one or more airbags in the front, side and bead impact areas of front occupants and rear occupants are known. These airbags, in the event of a vehicle impact, are inflatable as a function of impact delay and impact direction, by means of an individually associated, activable gas generator, to cushion and attenuate an impact on an occupant.

U.S. Pat. No. 5,738,368 discloses a safety device having a back seat airbag for a motor vehicle, comprising at least one back seat for a rear occupant and a front seat assembly arranged in front of the back seat and consisting of a seat part and a backrest. The at least one back seat airbag is inflatable by means of at least one gas generator activable in event of a sensed vehicle impact. The at least one back seat airbag collapsed in neutral position and the at least one gas generator are arranged and fixed in the rear of a front seat backseat and adjustable together with the latter. The back seat airbag is so fashioned, and an airbag exit opening is so directed upon the back seat occupant that the fired back seat airbag is expandable towards the chest and head of the back seat occupant.

Concretely for this purpose, in a rearward region of the front seat backrest, an opening is provided into which a supporting plate is fitted, firmly connected to lateral backrest frame parts by way of a lateral attachment flange. On this supporting plate, the gas generator is arranged and held together with the airbag. The backrest frame parts are swingably articulated to the seat structure to make possible an adjustment of the inclination of the backrest. The swing articulations are designed and dimensioned so strong that forces can be absorbed and transmitted by them. In addition, a swinging flap is provided, swingably articulated to the supporting plate and, in neutral position with safety device not activated, closing the openings in the front seat backrest and accordingly covering the supporting plate, including gas generator and airbag. In event of activation of the safety device, the swinging flap is swung by the inflating airbag into an open position, so that the airbag can unfold towards the head and chest in front of the back seat occupant. The swinging flap is at the same time held in a certain swing position by retaining bands. A disadvantage of this construction is that seat comfort is considerably reduced by the arrangement of numerous hard parts in the backrest, because under load they will press through the backrest of the front seat. Besides, such a construction is evidently elaborate and hence expensive, so that in practical use, such a device is less adapted to the purpose upon the whole.

U.S. Pat. No. 5,324,071 discloses a safety device for a motor vehicle in which an airbag module comprising a gas generator is fixed, not to the vehicle seat but, independently of the vehicle seat, to a framework fixed to the floor. This framework is fixed to the floor by way of a slide rail stationary relative to the floor, the seat being adjustable relative to the framework and hence relative to the airbag module fixed to the framework. The airbag module is here configured as a bead-supporting airbag module, and can be accommodated in a receptacle at the back of the headrest in certain adjusted positions of the vehicle seat only. What this is supposed to accomplish is that the distance of the headrest airbag from the back seat occupant region behind it is always the same.

U.S. Pat. No. 5,782,529 discloses a safety device on a vehicle seat in which an inflatable airbag is integrated into the backrest, and upon activation of the safety device, it inflates inside the backrest and therefore can furnish an impact protection for the user of the seat in question. Part of this airbag may also be so constructed inside the backrest that it provides protection for the knee region of a rear occupant seated behind. A gas generator is here merely represented schematically in the seat portion. No inflatable back seat airbag inflatable towards the head and chest of a rear occupant sitting behind the front seat is provided.

French Patent 2,131,475 A discloses a vehicle seat around which a supporting framework is arranged for attachment of parts such as for example safety devices. Such a construction, especially in crash situations, constitutes a considerable potential hazard to the vehicle occupants, in particular those seated behind the vehicle seat in question, and is therefore impracticable. Besides, such a framework is unattractive.

Japanese Patent Publication 04 166,455 discloses a construction of a safety device for a motor vehicle, in which an airbag module is arranged in an upper rear portion of a front seat backrest. By way of a control means, the inclination of the front seat backrest can be adjusted relative to the back seat occupant seated on the corresponding back seat.

Thus a problem underlying all of these arrangements consists in mounting the airbags, and particularly the gas generators, at locations in the vehicle where the requisite space is available, without poor appearance, and providing a favorable position of an airbag deployment opening from the point of safety engineering, together with a practicable airbag framework.

The object of the invention is to propose a suitable installation for a rear seat airbag device this is simple and inexpensive to produce.

SUMMARY OF THE INVENTION

In accordance with the invention, a rear seat airbag device includes an airbag arranged in an airbag housing which is mounted to the rear portion of a front seat. The housing has an airbag deployment opening directed to deploy the airbag toward the head and chest of a rear seat occupant.

Advantageously, the gas generator of the airbag apparatus may be connected to the seat underframe in an especially stable manner, without need to provide costly measures for this purpose. This means that the seat underframe may thus be employed in an advantageous twofold function for stable attachment of the at least one gas generator and at the same time of an airbag housing module as a whole. This contributes considerably to the functional dependability of the safety device over all. A rigid fixation by way of a carrier, or a direct fixation of the gas generator to the seat underframe in the rear area of the front seat part is further favorable in that the structural space there available is otherwise unused. In addition, seat comfort is not impaired by such an arrangement, since the rear area of the front seat regularly lies beneath the under side of the backrest and therefore is in any event not loaded by a front seat occupant.

With the back seat airbag arrangement in the rear area of the front seat, directly in front of a back seat occupant, a rapid and direct deployment of the back seat airbag in a region of potential impact on a back seat occupant can be achieved.

In one embodiment, the airbag module consists of a back seat airbag and the at least one gas generator is arranged in the rear area of the front seat, preferably in or on the underframe, and integrated with an airbag deployment opening directed obliquely to the rear and upward. The back seat airbag may include a flat and narrow lower portion that deploys in a first stage along the front seat backrest upward without colliding with the feet or knees of a back seat occupant. Then in a second phase, a voluminous upper portion of the back seat airbag unfolds in front of the back seat occupant in the chest and head direction. Thus, the filled back seat airbag has a flat and narrow configuration in the lower region and a voluminous configuration in the upper region. Such an embodiment, with good protective function, may be economically installed. The airbag deployment opening may alternatively be formed in the case of a crash only, in that the expanding airbag rips along a seam of a cover closing the airbag deployment opening and integrated in the front seat part, thus clearing the airbag deployment opening.

In another embodiment, a gas generator is integrated in the rear area of the front seat part, preferably in the seat underframe. The housing includes a cover behind the front seat backrest and resting in contact therewith, wherein the cover is capable of being forced away from the rear surface of the front seat backrest to form a passage. Between the rear surface of the front seat backrest and the cover is located a back seat airbag area in the uninflated condition, connected to the gas generator and partly unfolded. In the case of an activation of the back seat airbag due to a crash, the airbag forces the covering by pressure build-up in a first phase to form a cushion which also acts as passage. Through this passage, the upper portion of the back seat airbag is then deployed out in front of the back seat occupant in chest and head direction.

Preferably, the cover extends as a plate-like part from the front seat underframe upward about to a middle portion of the front seat backrest. Thus the cover in combination with the airbag part filled in the passage may advantageously configure a knee cushion as knee airbag for the remaining protective function of the back seat airbag.

In a preferred embodiment, the cover is swingably articulated to the front seat underframe and spring-loaded towards the rear surface of the front seat backrest. By such a swingable and spring-loaded arrangement, the cover advantageously moves in contact with the front seat backrest at its various adjustments of inclination. An accompanying motion of the cover is possible with a swingable mounting of the cover even if the cover is connected to the front seat backrest. Such a connection may for example be made by at least one tear strip, as a weak point intended to fail upon elevation of pressure in the back seat airbag to form the passage, in which case the cover is held by catch strips at a predetermined distance from the front seat backrest. Alternatively, the cover may be articulated to the front seat backrest only.

In another alternative embodiment, a stirrup is arranged behind the front seat backrest as carrier for the back seat airbag and the gas generator. The stirrup is of inverted U-shaped configuration, with the ends of the side legs of the stirrup being connected to the front seat underframe and/or to a seat rail. The cross-bar of the stirrup thus lies behind the front seat backrest surface, and higher than the front seat part. In the cross-bar of the stirrup, the back seat airbag is accommodated in its uninflated position. The airbag deployment opening is preferably arranged directed obliquely upward and rearward, so that upon activation of the back seat airbag due to a crash, it will be fillable in front of the back seat occupant to be protected in chest and head direction. The gas generator may be arranged in the cross-bar or in the seat underframe, in which case it will be connected to the airbag sack by way of a gas line.

In a preferred modification of this embodiment, the cross-bar of the stirrup is padded at least in the areas facing the knees of a back seat occupant, thus having the function of a knee cushion.

In this embodiment also, the stirrup may be swingably articulated to the front seat underframe, possibly with spring prestress, so that the stirrup will be carried along in various settings of the front seat backrest. Possibly also, the stirrup may be fixedly connected to the seat frame or the seat rails, and the backrest be adjusted within a limited region in front of the stirrup. This has the advantage that the stirrup will additionally reinforce the front seat, for example in a rear-end collision.

The function of the proposed airbag apparatus may be impaired if the front seat backrest is swung very far back in inclination, for example into a reclining position. To prevent such an impairment, it is proposed further that while the vehicle is being operated, an adjustment of the inclination of the front seat backrest be permitted only within a fixed comfort range, without extreme displacements to the rear. A swing of the front seat backrest into a reclining position may be released only when the vehicle is stationary. When starting a vehicle, with a front passenger seat backrest swung into reclining position, an acoustic or visual warning may be given, or the front seat backrest may be automatically erected from the reclining position by means of a mechanical drive. The swing of the front seat backrest may also be limited only in the event that there is an occupant sitting in the back seat. The back seat airbag may likewise, be arranged to deploy only if the corresponding rear seat is occupied.

DESCRIPTION OF THE INVENTION

Figure 1:
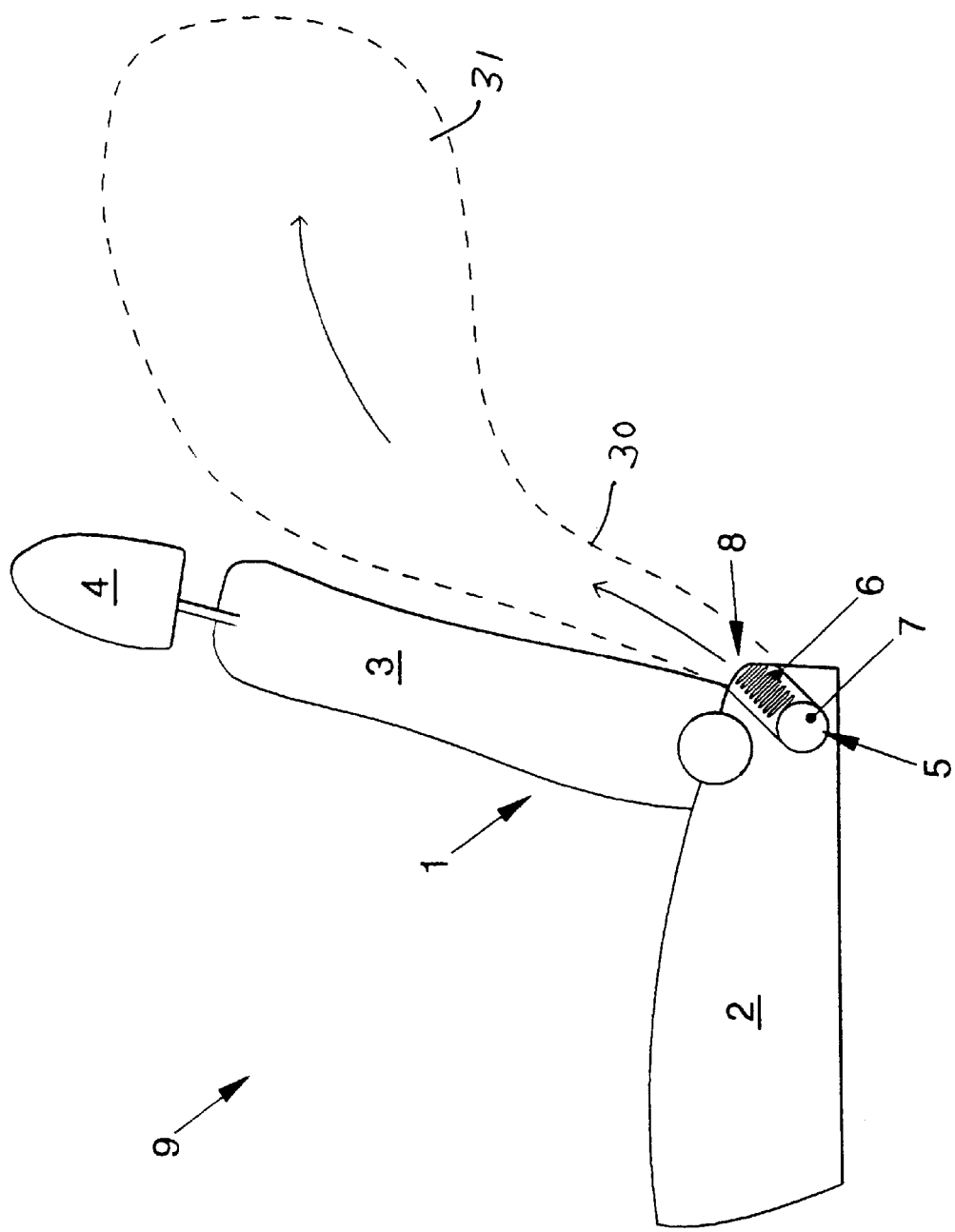
FIG. 1 shows a schematic representation of a first embodiment of an airbag device for a motor vehicle, in which an airbag module is arranged in a rear area of a front seat.

FIG. 1 shows a rear seat airbag device 9 mounted on front seat assembly 1. Front seat assembly 1, shown in a normal sitting position in FIG. 1, comprises a front seat part 2 having a swingable front seat backrest 3 with headrest 4. The front seat assembly 1 is arranged in front of a back seat for back seat occupants.

In the rear area of the front seat part 2, outside of the sitting area of the front seat occupant, an airbag module 5 is integrated in the seat underframe. The airbag module 5 comprises a back seat airbag 6 in collapsed deflated condition and an associated gas generator 7. An airbag deployment opening 8 is directed obliquely rearward and upward.

As shown dotted in FIG. 1, the back seat airbag 6 is so constructed that in the event of a crash, in a first phase, a lower portion 30 will unfold in an area behind and along the front seat backrest 3 upward. In a second phase, an upper portion 31 will deploy in chest and head direction in front of the back seat occupant. The back seat airbag 6 in filled condition is thus flat and narrow in the lower region 30 and voluminous in the upper region 31.

Figure 2:
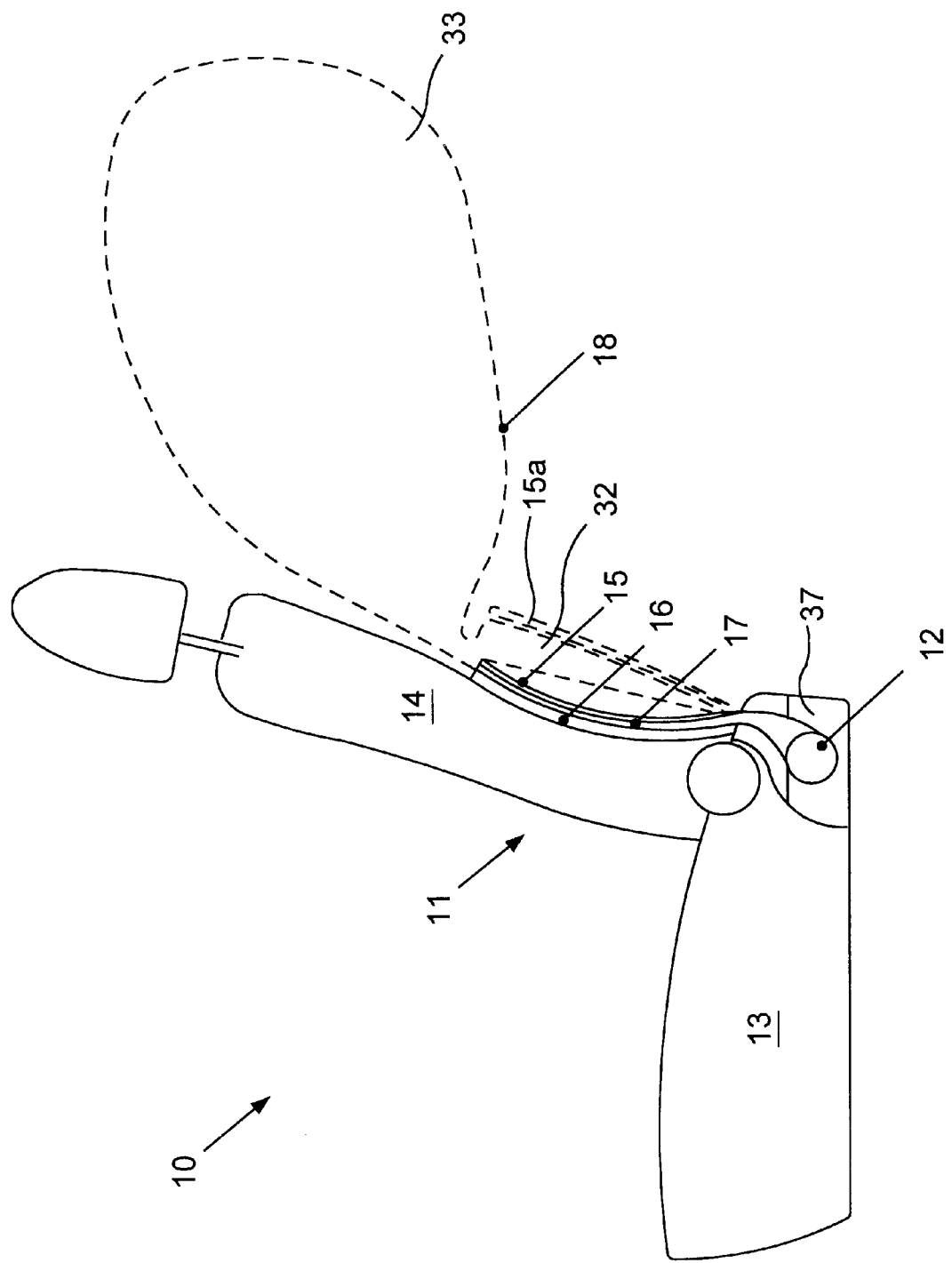
FIG. 2 shows a schematic representation of a second embodiment of an airbag device for a motor vehicle, having a back seat airbag capable of being unfolded by way of a passage.

FIG. 2 schematically shows a second embodiment of a rear seat airbag device 10 for a motor vehicle, on a front seat assembly 11. In this airbag device 10, a gas generator 12 is integrated in the rear area of a front seat 13 in the seat underframe 37, which is shown in the partially cut-away view.

Behind a backrest 14 of the front seat assembly 11, a cover 15 is arranged, extending upward as a plate-like part of the front seat underframe, as far as the middle of the front seat backrest height. The cover 15 is swingably articulated to the front seat underframe, and in the deflated position indicated by solid lines in FIG. 2, the cover 15 follows the contour of the rear surface 16 of the front seat backrest.

Between the rear surface 16 of the front seat backrest and the cover 15, in the uninflated condition, indicated by solid lines in FIG. 2, lies a partly deployed portion 17 of a back seat airbag 18 connected to the gas generator 12.

Upon activation of the back seat airbag 18 due to a crash, in a first phase it controllably pushes the cover 15 rearward to a deployed position 15a, forming a passage and a flat knee cushion as knee airbag 32, as indicated by dotted lines in the representation of FIG. 2. In a second phase, the upper portion 33 of back seat airbag 18 unfolds in chest and head direction in front of a back seat occupant, as likewise indicated by dotted lines in FIG. 2.

Figure 3:
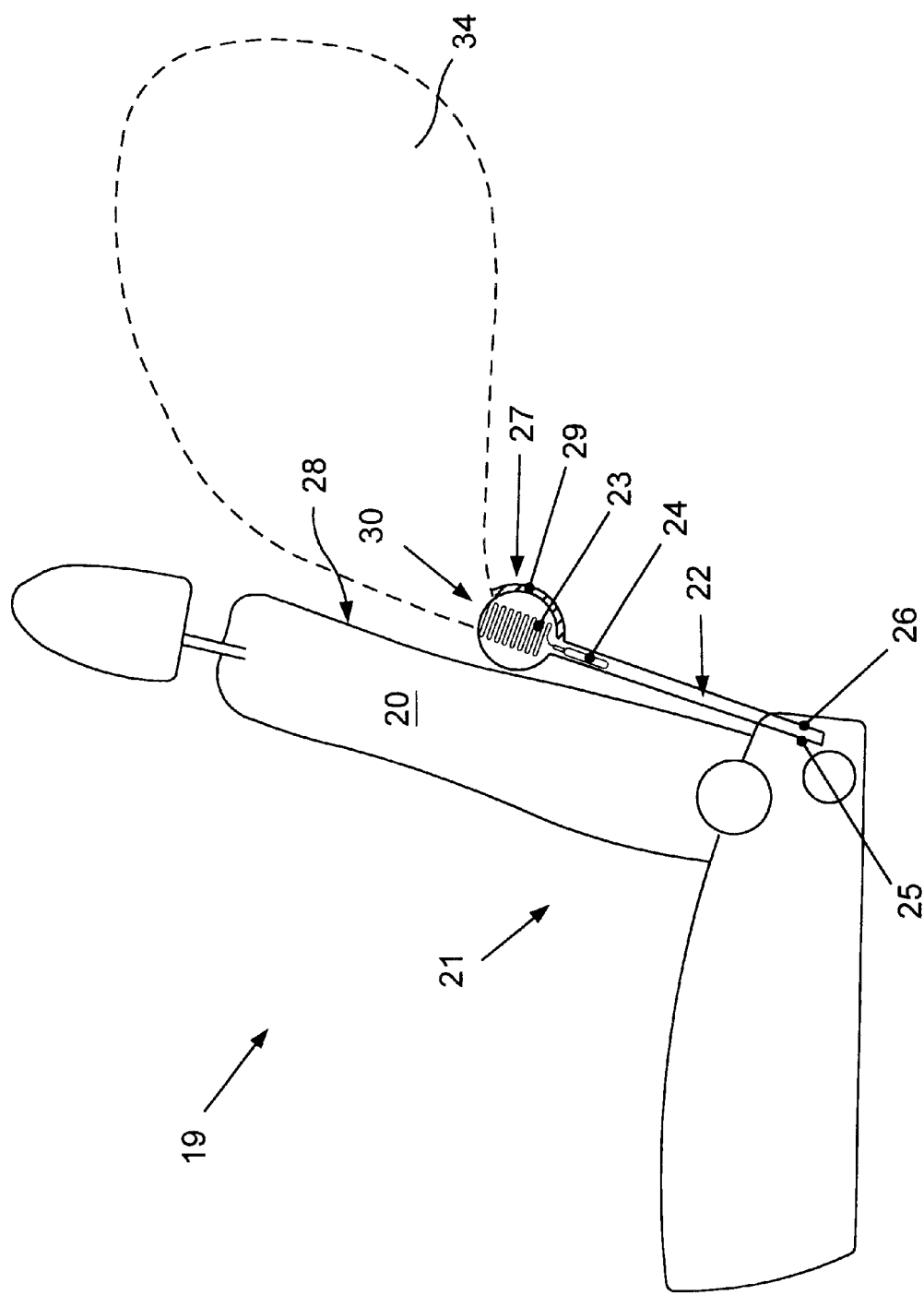
FIG. 3 shows a schematic representation of a third embodiment of an airbag device for a motor vehicle, having a stirrup as carrier for the back seat airbag and the gas generator.

FIG. 3 schematically shows a third embodiment of a rear seat airbag device 19. In the case of this airbag device 19, behind a backrest 20 of a front seat assembly 21, a stirrup 22 is mounted as carrier for a back seat airbag 23 and a gas generator 24 connected to the back seat airbag 23.

The stirrup 22 is of inverted U-shaped configuration, and connected by the ends of the lateral legs 25, 26 of the stirrup to a front seat underframe. The stirrup 22 is swingably or fixedly articulated to the front seat underframe.

The stirrup 22 further comprises a stirrup cross-bar 27 extending more or less at the middle height of the front seat backrest 20 in the area of its rear surface 28.

As may be seen further in the schematic representation of FIG. 3, the cross-bar 27 of the stirrup is finished to function as a knee cushion with a pad 29 facing the knees of a back seat occupant. The stirrup 22 and the cross-bar 27 are so arranged as to form an airbag deployment opening 30 directed obliquely upward and rearward.

Upon activation of the back seat airbag 23 due to a crash, it is unfolded in chest and head direction in front of a back seat occupant, as indicated by dotted lines 34 in the representation of FIG. 3.

To prevent the functioning of the safety devices 9, 10 and 19 represented in FIGS. 1 to 3 from being impaired by a front seat backrest 3, 14 and 20 in a reclined position, visual or acoustic warnings may be provided. Alternatively, inclination adjustment of the front seat backrest 3, 14, 20 may be limited to a fixed comfort range only when the vehicle is in operation or when the rear seat is unoccupied. Full reclining maybe permitted only when the vehicle is not being operated or when the rear seat is vacant.

While there have been described what are believed to be the preferred embodiments of the invention, those skilled in the art will recognize that other and further changes can be made thereto without departing from the spirit of the invention, and it is intended to claim all such changes and modifications as fall within the true scope of the invention.

We claim:

1. A rear seat airbag device arranged for installation in a vehicle having an adjustable front seat assembly including a front seat bottom having an underframe, and a front seat backrest, comprising:

an airbag;

an airbag cover over said airbag in an uninflated, partially deployed condition, said cover mounted over a rear surface of said front seat backrest with said airbag between said cover and said backrest, and said cover and said airbag being adjustable with said front seat assembly, said airbag cover forming an airbag deployment opening between said cover and said backrest directed to deploy said airbag toward a head and chest portion of a rear seat occupant, and at least one gas generator arranged to inflate said airbag, wherein said gas generator is connected to said seat bottom underframe.

2. A rear seat airbag device according to claim 1 wherein said airbag is arranged to deploy in a first stage to expand said cover away from said rear surface and in a second stage to deploy an upper portion of said airbag through said deployment opening toward said head and chest portion of a rear seat occupant.

3. A rear seat airbag device as specified in claim 2 wherein said cover extends from said front seat bottom to a middle portion of said backrest, and wherein said cover is articulated to said front seat bottom.

4. A rear seat airbag device as specified in claim 1 wherein said backrest has a limited range of adjustment.

* * * * *